(12) United States Patent
Davis et al.

(10) Patent No.: US 9,037,611 B2
(45) Date of Patent: May 19, 2015

(54) GENERATION OF A USER INTERFACE BASED ON A RELATIONAL DATA MODEL

(75) Inventors: Kevin Graham Davis, Seattle, WA (US); Yu-Kae Michael Cheng, Bellevue, WA (US); Joshua Michael Nogales, Bellevue, WA (US); Robert Warren Piper, Medina, WA (US); Ryan McMinn, Seattle, WA (US); Mohamed Mohsen Elsayed Hassan Helal, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/614,247

(22) Filed: Sep. 13, 2012

(65) Prior Publication Data

US 2014/0074891 A1    Mar. 13, 2014

(51) Int. Cl.
*G06F 17/30* (2006.01)
*G06F 7/00* (2006.01)

(52) U.S. Cl.
CPC . *G06F 7/00* (2013.01); *G06F 17/30* (2013.01)

(58) Field of Classification Search
USPC .................................................. 707/790, 791
See application file for complete search history.

(56) References Cited

U.S. PATENT DOCUMENTS

| | | | |
|---|---|---|---|
| 6,035,300 A | | 3/2000 | Cason et al. |
| 7,062,502 B1 | | 6/2006 | Kesler |
| 7,490,099 B2 | * | 2/2009 | Myers et al. ........................ 1/1 |
| 7,664,729 B2 | * | 2/2010 | Klein et al. ................... 707/791 |
| 8,069,188 B2 | * | 11/2011 | Larson et al. ................. 707/802 |
| 8,078,598 B2 | * | 12/2011 | Bell et al. ...................... 707/705 |
| 8,131,766 B2 | * | 3/2012 | Idicula et al. ................. 707/791 |
| 8,140,595 B2 | * | 3/2012 | Dettinger et al. ............. 707/809 |
| 8,161,075 B1 | | 4/2012 | Long et al. |
| 8,200,700 B2 | * | 6/2012 | Moore et al. .................. 707/791 |
| 8,266,124 B2 | * | 9/2012 | Thomas et al. ............... 707/703 |
| 2003/0169284 A1 | * | 9/2003 | Dettinger et al. ............. 345/708 |
| 2010/0192077 A1 | | 7/2010 | Mochko |

OTHER PUBLICATIONS

"An Introduction to the Force.com Database", Retrieved at <<http://wiki.developerforce.com/page/An_Introduction_to_Force_Database>>, May 16, 2012, pp. 8.
"Rapid Application Prototype", Retrieved at <<http://www.projectpro.com/Tech/RAP/RapWhitePaper.htm>>, Oct. 9, 2010, pp. 33.
"Moving from Release v1 to Release v2", Retrieved at <<http://wiki.service-now.com/index.php?title=Moving_from_Release_v1_to_Release_v2>>, Jan. 3, 2007, pp. 4.
"Analysis Services Parent-Child Dimension Naturalizer", Retrieved at <<http://pcdimnaturalize.codeplex.com/>>, Jan. 25, 2010, pp. 10.

* cited by examiner

*Primary Examiner* — Kim Nguyen
(74) *Attorney, Agent, or Firm* — Damon Rieth; Jim Ross; Micky Minhas (57) ABSTRACT

Technologies are described herein for generating a user interface based on a relational data model. A relational data model may be received. The relational data model may define a plurality of tables including a first table and a second table. The first table may include a first plurality of fields, and the second table may include a second plurality of fields. Relationships between the plurality of tables in the relational data model may be identified. A plurality of forms may be generated based on the relationships as identified. Each of the plurality of forms may correspond to one plurality of tables. The plurality of forms may be linked based on the relationship. The user interface including the plurality of forms as linked may be generated.

18 Claims, 5 Drawing Sheets

GENERATION OF A USER INTERFACE BASED ON A RELATIONAL DATA MODEL

BACKGROUND

Given a particular set of structured data, an enterprise may seek to provide users with a customized user interface configured to present the structured data in an intuitive and practical environment. In particular, the user interface may provide useful views of the structured data, as well as functionality enabling the user to interact with the structured data. However, conventional processes for creating such user interfaces can be difficult to implement, especially for interface designers who have little or no programming experience.

It is with respect to these considerations and others that the disclosure made herein is presented.

SUMMARY

Technologies are described herein for generating a user interface based on a relational data model. An interface generation system may identify relationships between tables in the relational data model. The interface generation system may also generate one or more forms for each table in the relational data model. The interface generation system may link the forms in accordance with the identified relationships between the corresponding tables. The generated and linked forms may form a user interface for interacting with data from a relational database arranged according to the relational data model.

In some example technologies, a method for generating a user interface based on a relational data model is provided. According to the method, a relational data model may be received. The relational data model may define a plurality of tables including a first table and a second table. The first table may include a first plurality of fields, and the second table may include a second plurality of fields. Relationships between the plurality of tables in the relational data model may be identified. A plurality of forms may be generated based on the relationships as identified. Each of the plurality of forms may correspond to one plurality of tables. The plurality of forms may include a first form associated with the first table and a second form associated with the second table. The first form may include a plurality of first controls. Each of the plurality of first controls may include one of the first plurality of fields. The second form may include a plurality of second controls. Each of the plurality of second controls may correspond to one of the second plurality of fields. The plurality of forms may be linked based on the relationship. The user interface including the plurality of forms as linked may be generated.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is generally directed to concepts and technologies for generating a user interface based on a relational data model. Through the use of the concepts and technologies described herein, an interface generation system may be configured to receive a relational data model (also referred to as a "schema"), identify relationships within the relational data model, and generate a user interface based on the data model. The user interface may be utilized by a user to enter, view, edit, or otherwise interact with a database arranged according to the relational data model. Such a database may be referred to herein as a relational database. The relational database may be configured to store one or more records.

A relational data model may define multiple tables. Each table may include a set of related fields. A table may represent a particular category of fields, and the fields of the table may represent types of values that are associated with the category. Each record in the corresponding relational database may include data items corresponding to the fields of one of the tables. For example, an illustrative relational data model may define an employee table that includes an employee identifier field, a name field, and a hire date field. In this example, an illustrative record in the corresponding relational database may include data items corresponding to the employee identifier field, the name field, and/or the hire date field.

In some instances, one table may reference another table. A reference (also referred to as a look up) by one table to another table may indicate a relationship between the two tables. The interface generation system may be configured to identify the relationships between the tables in the relational data model. Upon identifying the relationships, the interface generation system may be configured to generate one or more forms for each table. A form may refer to a database object on which interface controls (hereinafter referred to as controls) are placed. The form may be utilized by a user to interact with records in the relational database. In particular, the controls may enable the user to enter, view, edit, or otherwise interact with records in a relational database. A user interface for the relational data model may include multiple forms, arranged according to one or more views and/or configurations. For example, an illustrative view of a user interface may include a split view of two or more forms. These forms may be linked according to the identified relationships of the associated tables.

For purposes of aiding in the description of example technologies for generating a form, the table for which a form is generated may be referred to herein as a primary table of the form. Other tables that have a relationship with the primary table may be referred to herein as secondary tables of the form. Similarly, records in the relational database that include data items that correspond to the fields of the primary table may be referred to herein as primary records. Records in the relational database that include data items that correspond to the fields of a secondary table may be referred to herein as a secondary record. It should be noted that a given table may be a primary table for one form, but a secondary table for other forms.

A form for a given primary table may include a primary record list and a tabbed portion. The primary record list may include a list view of a primary record. In the list view, data items from the primary record and corresponding to the fields of the primary table may be displayed in a list format. Each data item may be presented within a corresponding control that enables a user to enter, view, edit, or otherwise interact with the data item. Some example interface controls may include text boxes, drop-down lists, radio buttons, sliders, spinners, and other suitable graphical user interface elements.

The tabbed portion may include one or more tab-pane pairs. Each tab-pane pair may correspond to a secondary table. As previously described, the secondary tables may have a relationship with the primary table. For example, the secondary tables may each reference the primary table. Each tab may be selectable by a user. When a user selects a particular tab, the corresponding pane in the tab-pane pair may be displayed to the user. Rather than display each data item from the secondary record, the pane may be configured to display only data items corresponding to a subset of fields of the secondary table. As used herein, a record portion may refer to a subset of data items from a record. In some embodiments, the pane may be arranged in a grid format, where each row corresponds to a record portion, each column corresponds to a field, and each element contains a data item that corresponds to a particular record portion (i.e., row) and a particular field (i.e., column).

The secondary records may be filtered such that only secondary records that relate to the primary record are shown. For example, an illustrative form may display a particular company name from the primary record in the primary record list. When a user selects a tab that corresponds to employee information, a pane associated with the tab may display employee information. Such employee information may be filtered such that only employee information corresponding to the displayed company name is shown. That is, employee information associated with other company names is not shown.

In an illustrative example, a relational data model may include a first table, a second table, and a third table. A user interface may include a first form generated for the first table (i.e., the first table is the primary table), a second form generated for the second table (i.e., the second table is the primary table), and a third form generated for the third table (i.e., the third table is the primary table). The first table may be referenced by the second table, and the second table may be referenced by the third table.

In this example, the first form may include a first primary record list. The first form may also include a first tab corresponding to the second table and a first pane associated with the first tab. Further, the second form may include a second primary record list. The second form may also include a second tab corresponding to the third table and a second pane associated with the second tab. The relational database that is arranged according to the relational data model may include a first record, a second record, and a third record. The first record may include data items corresponding to fields of the first table. The second record may include data items corresponding to fields of the second table. The third record may include data items corresponding to fields of the third table.

The first primary record list may be a list view of the first record. When a user selects the first tab in the first form, the first form may display the first pane. The first pane may include multiple record portions, each of which is arranged on a separate row of the first pane. Each record portion in the first pane may include a subset of data items from a record containing data items corresponding to fields of the second table. The record portions in the first pane may be filtered such that the record portions relate to the first record. Each row in the first pane may be selectable by a user. For example, one of the rows in the first pane may correspond to the second record and display a subset of data items from the second record. When a user selects the row corresponding to the second record, the user interface may display the second form. For example, the second form may be displayed in a pop-up window arranged on or near the first form.

The second primary record list may be a list view of the second record. When a user selects the second tab in the second form, the second form may display the second pane. The second pane may include multiple record portions, each of which is arranged on a separate row of the second pane. Each record portion in the second pane may include a subset of data items from a record containing data items corresponding to fields of the third table. The record portions in the second pane may be filtered such that the record portions relate to the second record. Each row in the second pane may be selectable by a user. For example, one of the rows in the second pane may correspond to the third record and display a subset of data items from the third record. When a user selects the row corresponding to the third record, the user interface may display the third form. For example, the third form may be displayed in a pop-up window arranged on or near the second form.

In the above described manner, the user interface may link multiple forms based on the identified relationships of the corresponding tables in the relational data model. In particular, multiple forms may be linked via rows within panes in each of the forms. A user can navigate or drill-down between the forms by selecting particular rows in the panes. The user interface generation system may be configured to generate and link these forms based on a given relational data model. The generated and linked forms may form a user interface that enables a user to enter, view, edit, or otherwise interact with data from the relational database.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
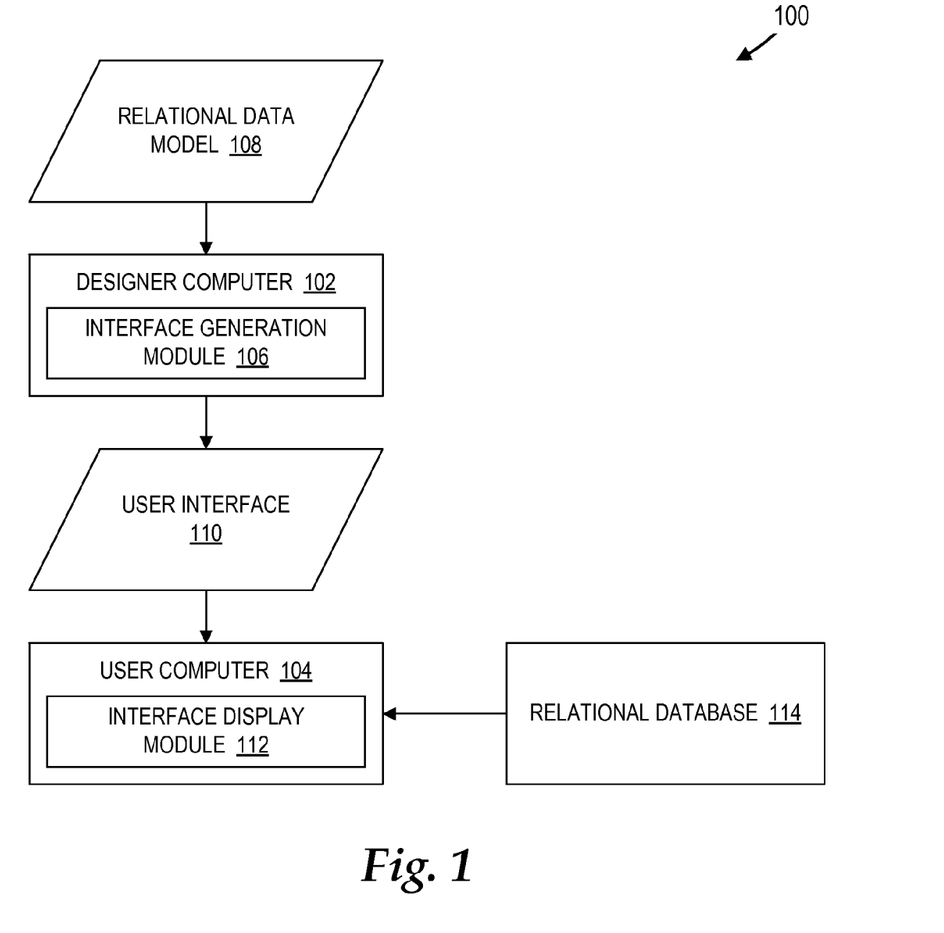
FIG. 1 is a block diagram illustrating an example user interface generation environment, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, a computing system and methodology for generating a user interface based on a relational data mode will be described. In particular, FIG. 1 is a block diagram illustrating an example user interface generation environment 100, in accordance with some embodiments. The user interface generation environment 100 may include a designer computer 102 and a user computer 104.

The designer computer 102 may be configured to execute an interface generation module 106. The interface generation module 106 may be configured to receive as input a relational data model 108. The relational data model 108 may define multiple tables, each of which includes one or more fields. An example of the relational data model 108 is described in greater detail below with reference to FIG. 3. The interface generation module 106 may be configured to generate a user interface 110 based on the relational data model 108. The user interface 110 may include multiple forms. An example of a form is described in greater detail below with reference to FIG. 4. Additional details regarding the operation of the interface generation module 106 will be described in greater detail below with reference to FIG. 2.

The user computer 104 may be configured execute an interface display module 112. The interface display module 112 may be configured to utilize the user interface 110 to access structured data contained in a relational database 114. In particular, the relational database 114 may be arranged according to the relational data model 108. The relational data model 108 may include multiple records. Each record may include data items corresponding to each field in one of the tables of the relational data model 108. Through the interface display module 112, a user may utilize the user interface 110 to enter, view, edit, or otherwise interact with records in the relational database 114. The interface display module 112 may be any suitable application capable of displaying the user interface 110.

Figure 2:
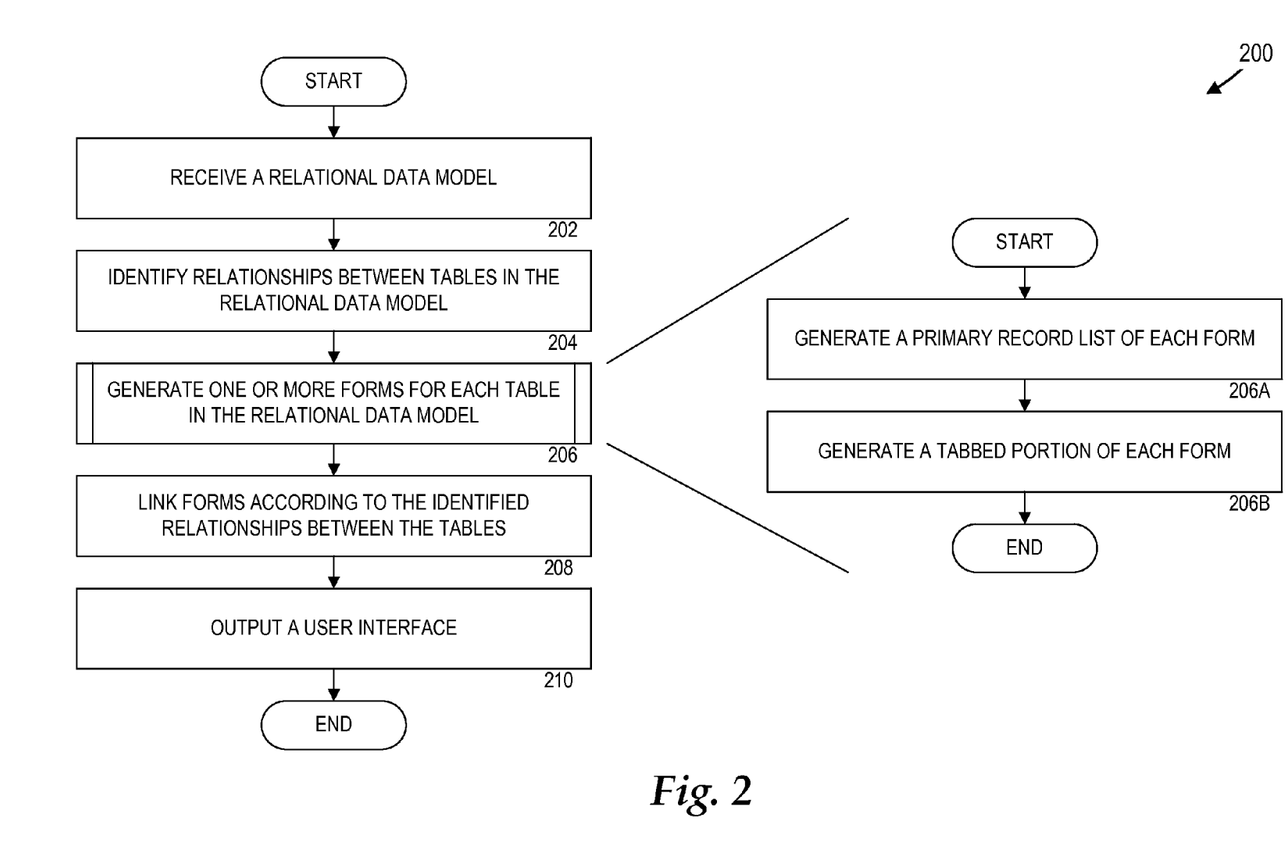
FIG. 2 is a flow diagram illustrating an example method for generating a user interface, in accordance with some embodiments.

Referring now to FIG. 2, additional details regarding the operation of the interface generation module 106 will be described. FIG. 2 is a flow diagram illustrating an example method for generating a user interface, such as the user interface 110, in accordance with some embodiments. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

In FIG. 2, a routine 200 begins at operation 202, where the interface generation module 106 may receive a relational data model, such as the relational data model 108. The relational data model 108 may define multiple tables. Each table may include multiple fields. In an illustrative example, a music-related data model may include a Bands table, a Members table, and an Albums table. Some example fields of the Bands table may include a Band Identifier ("ID") field, Band Name field, a Primary Contact field, and a Deal Type field. Some example fields of the Members table may include a Member ID field, the Band ID field, a Member Name field, an Age field, a Nickname field, a Hire date field, and a Smoker field. Some example fields of the Albums table may include an Album ID field, the Band ID field, a Number of Tracks field, a Genre field, a Total Duration field, a Download Sales field, a Physical Sales field, and a Total Sales field. After operation 202, the routine 200 may proceed to operation 204.

At operation 204, the interface generation module 106 may identify relationships between the tables in the relational data table. A relationship may exist between two tables when one table references another table. In the previous example of the music-related data model, the Members table and the Albums table each reference the Bands table. More specifically, the Members table and the Albums table each reference the Band ID field in the Bands table. Thus, in this example, the Bands table has a relationship with both the Members table and the Albums table. According to various embodiments, the interface generation module 106 may be configured to store the identified relationships in a dependency graph or other suitable data structure capable of r relationships between the tables. After operation 204, the routine 200 may proceed to operation 206.

At operation 206, the interface generation module 106 may generate one or more forms for each table in the relational data model. When the interface generation module 106 generates a form for a particular table, this table may be referred to as the primary table of the form. Tables that reference the primary table may be referred to as secondary tables of the form. A relational database that is arranged according to the primary table may include primary records. Other relational databases that are according to the secondary tables may include may also include secondary records. In the previous example of the music-related data model, when a form is created for the Bands table, the Bands table may be referred to as the primary table of the form. The Members table and the Albums table may be referred to as secondary tables of the form.

Operation 206 may include operation 206A and operation 206B. At operation 206A, the interface generation module 106 may generate a primary record list of each form. The primary record list may include a list view of the primary record. In the list view, data items from the primary record and corresponding to the fields of the primary table may be displayed in a list format. Each data item may be presented within a corresponding control that enables a user to enter, view, edit, or otherwise interact with the data item.

According to various embodiments, the appropriate control may be selected based on the content type of the field corresponding to the data item. In the previous example of the music-related data model, a text box may be selected to present a data item corresponding to the Name field because such data item contains a string of letters. Similarly, a text box may be selected to present a data item corresponding to the Primary Contact field because such data item contains a string of letters. A drop-down list may be selected to present a data item corresponding to the Deal Type field because such data item belongs to a finite set of predefined options. Other controls that may be selected include radio buttons, sliders, spinners, or other suitable graphical user interface elements. After operation 206A, the routine 200 may proceed to operation 206B.

At operation 206B, the interface generation module 106 may generate a tabbed portion that includes one or more tab-pane pairs. Each tab-pane pair may correspond to a secondary table. When a user selects a particular tab, the corresponding pane in the tab-pane pair may be displayed to the user. Rather than display each data item from the secondary record, the pane may be configured to display only data items corresponding to a subset of fields of the secondary table. That is, the pane may be configured to display record portions. The pane may also be configured to filter results according to the primary record displayed in the primary record list. In some embodiments, the pane may be arranged in a grid format, where each row corresponds to a record portion, each column corresponds to a field, and each element contains a data item that corresponds to a particular record portion (i.e., row) and a particular field (i.e., column).

The interface generation module 106 may be configured to select the subset of the fields to be represented by data items in the record portion according to any suitable process. In a first example process, the interface generation module 106 may select any random or pseudo-random predefined number of fields from the secondary table. In a second example process, the interface generation module 106 may select the first predefined number of fields listed for the secondary table. In a third example process, the interface generation module 106 may select a predefined number of fields according to a default priority order. For example, the priority order may specify that text as being more important than numeric values or specify that an order number is more important than an order time. In a fourth example process, the interface generation module 106 may select a predefined number of fields according to metadata associated with the secondary table. For example, the metadata may explicitly specify that certain fields should be selected. After operation 206B, the routine 200 may proceed to operation 208.

At operation 208, the interface generation module 106 may link the forms in accordance with the identified relationships between the tables. In the previous example of the music-related data model, a first form may be generated where the Band table is the primary table, a second form may be generated where the Members table is the primary table, and a third form may be generated where the Albums table is the primary table. The tabbed portion of the first form may include a first tab corresponding to the Members table and a second tab corresponding to the Albums table.

When a user selects the first tab, a corresponding first pane may display record portions. Each record portion in the first pane may include a subset of data items from a record containing data items corresponding to fields of the Members table. Each record portion may be displayed on a separate row of the first pane. When a user selects one of the rows from the first pane, the user interface may display the second form via, for example, a pop-up window. When a user selects the second tab, a corresponding second pane may display record portions. Each record portion in the second pane may include a subset of data items from a record containing data items corresponding to fields of the Albums table. Each record portion may be displayed on a separate row of the second pane. When a user selects one of the rows from the second pane, the user interface may display the third form via, for example, a pop-up window. After operation 208, the routine 200 may proceed to operation 210.

At operation 210, the routine 200 may output a user interface that contains multiple forms corresponding to the tables of the relational data model. The forms may be linked in accordance with the identified relationships between the tables. After operation 210, the routine 200 may either repeat (e.g., periodically, continuously, or on demand as needed) or terminate.

Figure 3:
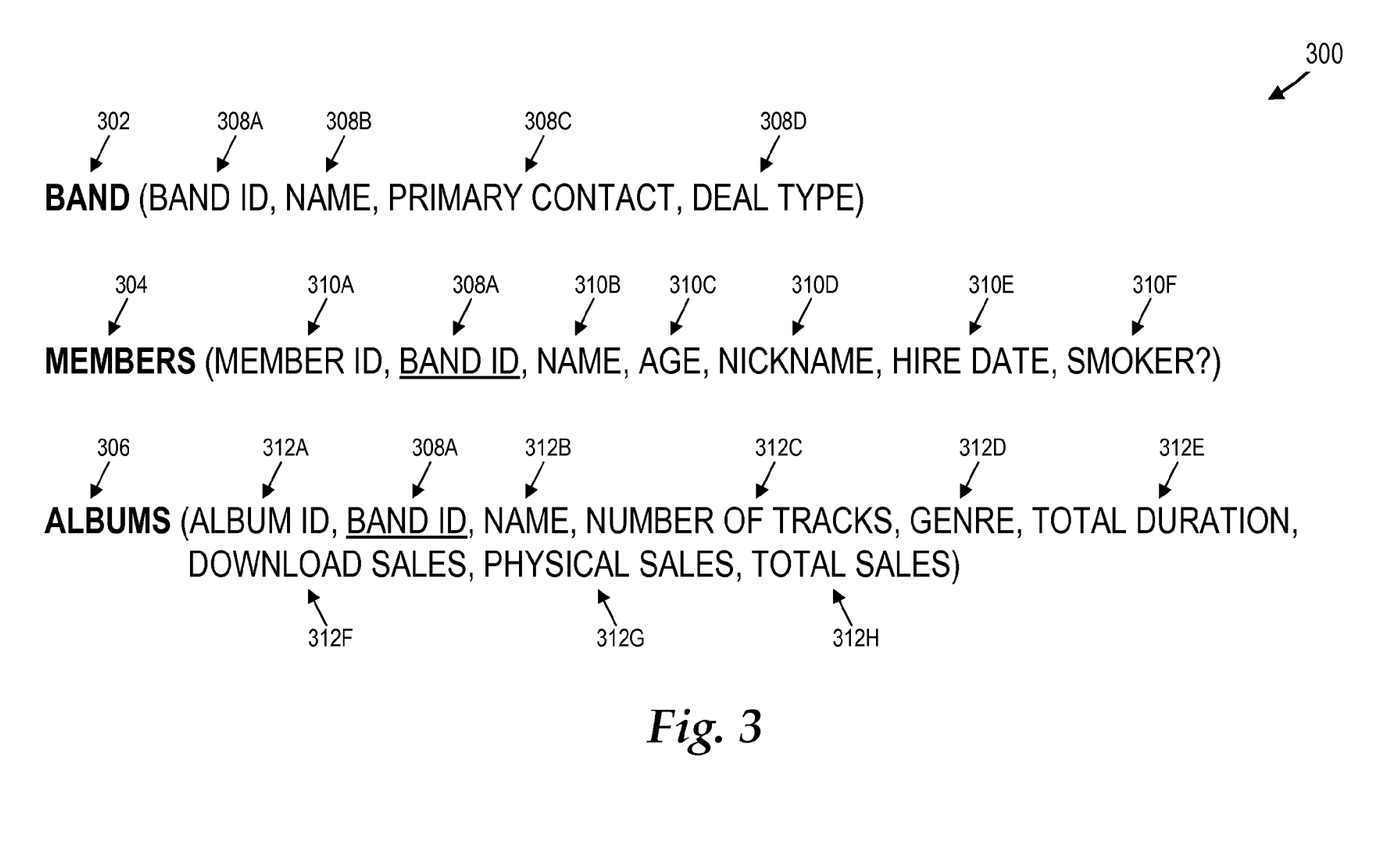
FIG. 3 is a diagram illustrating an example relational data model, in accordance with some embodiments.

Referring now to FIG. 3, additional details regarding relational data models will be provided. FIG. 3 is a diagram illustrating an example relational data model 300, in accordance with some embodiments. In particular, the relational data model 300 may be a music-related data model. The relational data model 300 may include a Bands table 302, a Members table 304, and an Albums table 306. The Bands table 302 may include a Band ID field 308A, a Band Name field 308B, a Primary Contact field 308C, and a Deal Type field 308D. The fields 308A-308D may be collectively or generically referred to as fields 308. The Members table 304 may include a Member ID field 310A, the Band ID field 308A, a Member Name field 310B, an Age field 310C, a Nickname field 310D, a Hire date field 310E, and a Smoker field 310F. The fields 310A-310F may be collectively or generically referred to as fields 310. The Albums table 306 may include an Album ID field 312A, the Band ID field 308A, an Album Name field 312B, a Number of Tracks field 312C, a Genre field 312D, a Total Duration field 312E, a Download Sales field 312F, a Physical Sales field 312G, and a Total Sales field 312H. The fields 312A-312H may be collectively or generically referred to as fields 312.

As illustrated in FIG. 3, the Members table 304 and the Albums table 306 both include a reference to the Band ID field 308A in the Bands table 302. As such, the Members table 304 and the Albums table 306 may each be considered to have a relationship with the Bands table 302. Each table in a given relational data model may have a relationship with zero, one, or more other tables.

Figure 4:
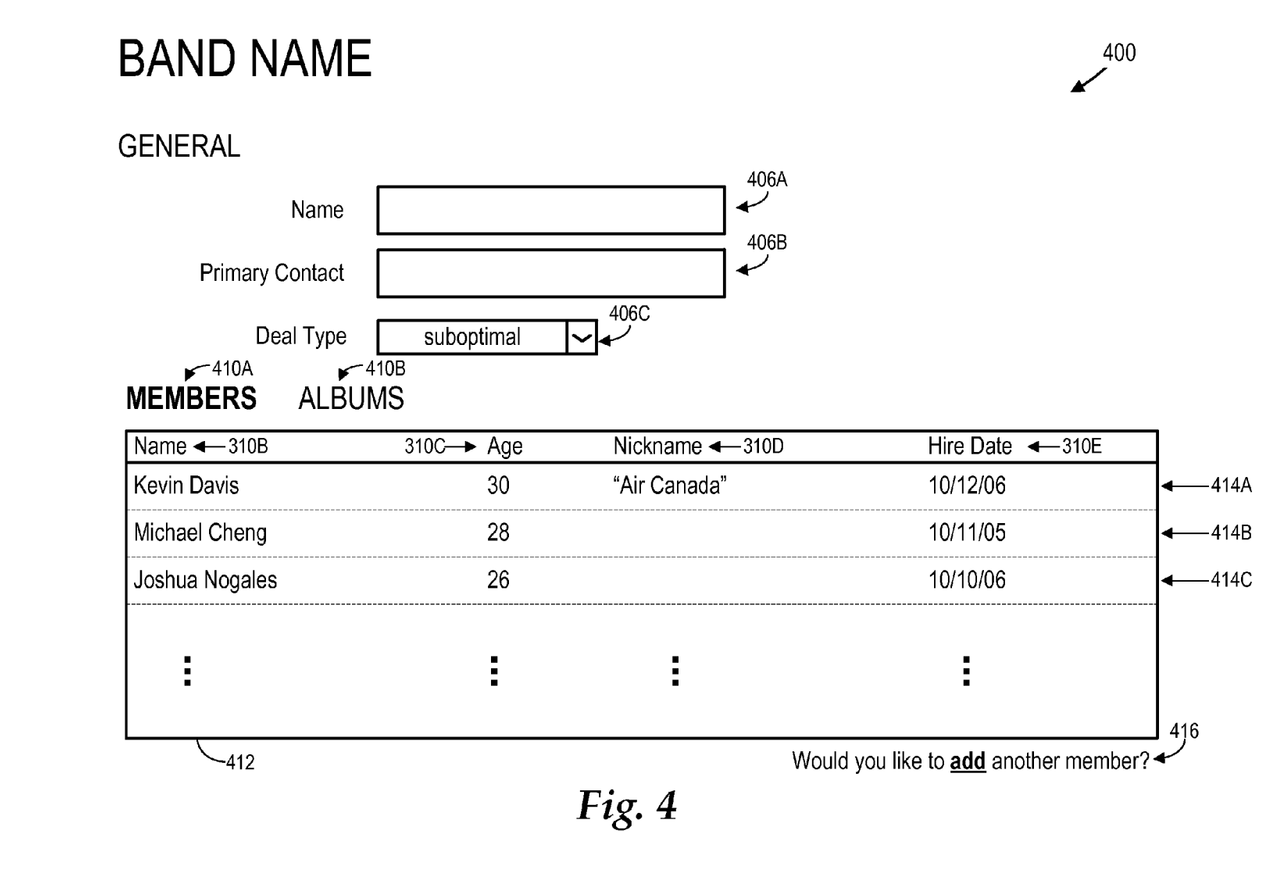
FIG. 4 is a screen display diagram illustrating an example form generated based on the relational data model of FIG. 3, in accordance with some embodiments.

Referring now to FIG. 4, additional details regarding the forms generated by the interface generation module 106 will be provided. FIG. 4 is a screen display diagram illustrating an example form 400 generated based on the relational data model 300 of FIG. 3, in accordance with some embodiments. In particular, the form 400 may be generated for the Bands table 302. The form 400 may include a primary record list 402 and a tabbed portion 404. The primary record list 402 may include controls 406A-406C corresponding to the Band Name field 308B, the Primary Contact field 308C, and the Deal Type field 308D of the Bands table 302. The controls 406A-406C may be collectively or generically referred to as controls 406. The controls 406A, 406B may be text boxes, which may indicate that data items corresponding to the Band Name field 308B and the Primary Contact field 308C are each a sequence of alphanumeric symbols having an infinite or substantially large number of possibilities. The control 406C may be a drop-down list, which may indicate that data items corresponding to the Deal Type field 308D have a small, fixed number of possibilities. Through the controls 406A-406C, a user may enter, view, edit, or otherwise interact with a particular record in a relational database arranged according to the Bands table 302.

The tabbed portion 404 may include a Members tab 410A and an Albums tab 410B. The Members tab 410A may correspond to the Members table 304. The Albums tab 410B may correspond to the Albums table 30. The Members tab 410A and the Albums tab 410B may be created for the form 400 because the Members table 304 and the Albums table 306 each has a relationship with the Bands table 302. The tabs 410A-410B may be collectively or generically referred to as tabs 410.

As illustrated in FIG. 4, a user has selected the Members tab 410A, as indicated by the bold font of the heading "MEMBERS". When the user selects the Members tab 410A, a pane 412 corresponding to the Members tab 410A may be displayed in the form 400. The pane 412 may include multiple record portions 414A-414C. The record portions 414A-414C may be collectively or generically referred to as record portions 414. Each of the record portions 414A-414C may include a subset of data items from a record containing data items corresponding to fields of the Members table 304. In particular, the subset of fields may include the Member Name field 310B, the Age field 310C, the Nickname field 310D, and the Hire date field 310E. Other fields of the Members table 304 are not represented in the pane 412. The pane 412 may also include an add record control 416. A user can select the add record control 416 in order to add new records. It should be noted that controls for the Member ID field 310A and the Band ID field 308A are not provided in the form 400. For example, controls for the Member ID field 310A and the Band ID field 308A may not be provided because data items corresponding to these fields may be a fixed value that cannot be edited.

When a user wants to further interact with the data in a particular record in the relational database, the user may select a row of the corresponding record portion 414A-414C. For example, if a user wants to edit the record for "Michael Cheng" in the relational database, the user may select the second row corresponding to the record portion 414B. When the user selects the second row, the user interface may display a second form corresponding to the Members table 304. The second form may include controls for presenting data items corresponding to the fields 310B-310F of the Members table 304. The second form may also include tabs corresponding to other tables in the relational data model 300 that reference the Members table 304.

Figure 5:
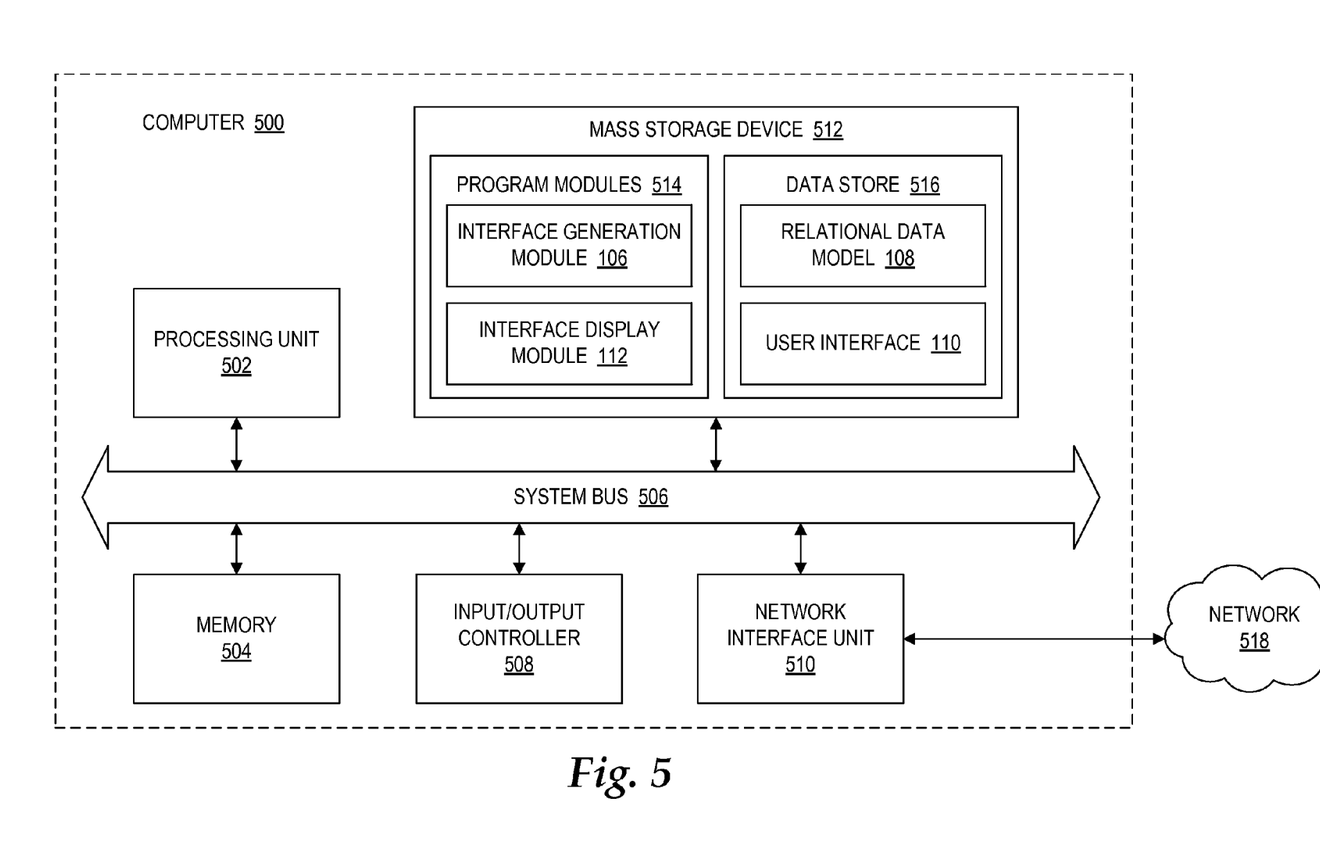
FIG. 5 is a computer architecture diagram showing an illustrative computer hardware architecture for a computing system capable of implementing the embodiments presented herein.

FIG. 5 is an example computer architecture diagram illustrating a computer 500. Examples of the computer 500 may include the designer computer 102 and the user computer 104. The computer 500 may include a central processing unit 502, a system memory 504, and a system bus 506 that couples the memory 504 to the central processing unit 502. The computer 500 may further include a mass storage device 512 for storing one or more program modules 514 and a data store 516. Examples of the program modules 514 may include interface generation module 106 and the interface display module 112. The data store 516 may store the relational data model 108 and the user interface 110. The interface generation module 106 may be configured to perform a method for generating a user interface based on a relational data model. The mass storage device 512 may be connected to the processing unit 502 through a mass storage controller (not shown) connected to the bus 506. The mass storage device 512 and its associated computer-storage media may provide non-volatile storage for the computer 500. Although the description of computer-storage media contained herein refers to a mass storage device, such as a hard disk or CD-ROM drive, it should be appreciated by those skilled in the art that computer-storage media can be any available computer storage media that can be accessed by the computer 500.

By way of example, and not limitation, computer-storage media may include volatile and non-volatile, removable and non-removable media implemented in any method or technology for the non-transitory storage of information such as computer-storage instructions, data structures, program modules, or other data. For example, computer-storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 518. The computer 500 may connect to the network 518 through a network interface unit 510 connected to the bus 506. It should be appreciated that the network interface unit 510 may also be utilized to connect to other types of networks and remote computer systems. The computer 500 may also include an input/output controller 508 for receiving and processing input from a number of input devices (not shown), including a keyboard, a mouse, a microphone, and a game controller. The input/output controller 508 may also be configured to receive user input via gestures, touch (e.g., via a touchscreen), and/or voice. Similarly, the input/output controller 508 may provide output to a display or other type of output device (not shown).

The bus 506 may enable the processing unit 502 to read code and/or data to/from the mass storage device 512 or other computer-storage media. The computer-storage media may represent apparatus in the form of storage elements that are implemented using any suitable technology, including but not limited to semiconductors, magnetic materials, optics, or the like. The computer-storage media may represent memory components, whether characterized as RAM, ROM, flash, or other types of technology. The computer-storage media may also represent secondary storage, whether implemented as hard drives or otherwise. Hard drive implementations may be characterized as solid state, or may include rotating media storing magnetically-encoded information.

The program modules 514 may include software instructions that, when loaded into the processing unit 502 and executed, cause the computer 500 to generate field sets. The program modules 514 may also provide various tools or techniques by which the computer 500 may participate within the overall systems or operating environments using the components, flows, and data structures discussed throughout this description. For example, the program modules 514 may implement interfaces for generating field sets.

In general, the program modules 514 may, when loaded into the processing unit 502 and executed, transform the processing unit 502 and the overall computer 500 from a general-purpose computing system into a special-purpose computing system customized to generate field sets. The processing unit 502 may be constructed from any number of transistors or other discrete circuit elements, which may individually or collectively assume any number of states. More specifically, the processing unit 502 may operate as a finite-state machine, in response to executable instructions contained within the program modules 514. These computer-executable instructions may transform the processing unit 502 by specifying how the processing unit 502 transitions between states, thereby transforming the transistors or other discrete hardware elements constituting the processing unit 502.

Encoding the program modules 514 may also transform the physical structure of the computer-storage media. The specific transformation of physical structure may depend on various factors, in different implementations of this description. Examples of such factors may include, but are not limited to: the technology used to implement the computer-storage media, whether the computer-storage media are characterized as primary or secondary storage, and the like. For example, if the computer-storage media are implemented as semiconductor-based memory, the program modules 514 may transform the physical state of the semiconductor memory, when the software is encoded therein. For example, the program modules 514 may transform the state of transistors, capacitors, or other discrete circuit elements constituting the semiconductor memory.

As another example, the computer-storage media may be implemented using magnetic or optical technology. In such implementations, the program modules 514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present description, with the foregoing examples provided only to facilitate this discussion.

Based on the foregoing, it should be appreciated that concepts and technologies for generating a user interface based on a relational data model are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for generating a user interface based on a relational data model, the method comprising:
    receiving the relational data model, the relational data model defining a plurality of tables, wherein each table of the plurality of tables represents a particular category of fields, wherein each field of the particular category of fields represents types of values that are associated with the particular category, wherein the plurality of tables includes a first table and a second table, and wherein the first table comprises a first plurality of fields and the second table comprises a second plurality of fields;
    identifying relationships between the plurality of tables in the relational data model;
    generating a plurality of forms based on the relationships as identified, each of the plurality of forms corresponding to one of a plurality of tables, the plurality of forms including a first form associated with the first table and a second form associated with the second table, the first form comprising a plurality of first controls, each of the plurality of first controls corresponding to one of the first plurality of fields, the second form comprising a plurality of second controls, each of the plurality of second controls corresponding to one of the second plurality of fields, generating the plurality of forms comprising
        generating a primary record list of the first form, the primary record list comprising the plurality of first controls, the plurality of first controls configured to display and to enable editing of a record, the record comprising related data from the first plurality of fields, and
        generating a tabbed portion of the form based on a relationship between the first table and the second table, the tabbed portion comprising a tab and a pane, the tab being selectable to display the pane, the pane configured to display a plurality of record portions, each of the plurality of record portions comprising related data from the second plurality of fields;
    linking the plurality of forms based on the relationships; and
    generating, by a computer, the user interface comprising the plurality of forms as linked.

2. The method of claim 1, wherein identifying the relationships between the plurality of tables in the relational data model comprises identifying the relationship between the first table and the second table when the second table comprises a reference to the first table.

3. The method of claim 1, wherein the plurality of tables further comprises a third table, the third table comprising a third plurality of fields;
    wherein identifying relationships between the plurality of tables in the relational data model further comprises identifying a second relationship between the first table and the third table when the third table comprises a second reference to the first table; and
    wherein generating the plurality of forms based on the relationships as identified further comprises generating a second tabbed portion of the form based on the second relationship between the first table and the third table, the second tabbed portion comprising a second tab and a second pane, the second tab being selectable to display the second pane, the second pane configured to display a second plurality of record portions, each of the second plurality of record portions comprising related data from the third plurality of fields.

4. The method of claim 1, further comprising selecting a subset of the second plurality of fields for the plurality of record portions by selecting a fixed number of fields from the second plurality of fields according to a priority order defined by metadata associated with the second table, if the metadata is available.

5. The method of claim 4, further comprising selecting the subset of the second plurality of fields by selecting the fixed number of fields from the second plurality of fields according to a default priority order, if the metadata is unavailable.

6. The method of claim 1, wherein the tabbed portion further comprises an add record control configured to enable a new record to be added to the second table.

7. The method of claim 1, wherein the pane comprises a plurality of rows and each of the plurality of record portions is arranged on one of the plurality of rows; and
    wherein linking the plurality of forms based on the relationships comprises configuring each of the plurality of rows as being selectable to launch the second form based on the relationship between the first table and the second table.

8. The method of claim 1, further comprising:
    receiving a user selection of the tab; and
    responsive to receiving the user selection of the tab, filtering the plurality of record portions based on the record displayed in the primary record list and displaying the pane containing the plurality of record portions as filtered.

9. The method of claim 1, wherein identifying the relationships between the plurality of tables in the relational data model comprises updating a dependency graph of the plurality of tables in accordance with the relationships that are identified.

10. An optical disk, a magnetic storage device, or a solid state storage device having computer-executable instructions stored thereon which, when executed by a computer, cause the computer to:
    receive a relational data model, the relational data model defining a plurality of tables, wherein each table of the plurality of tables represents a particular category of fields, wherein each field of the particular category of fields represents types of values that are associated with the particular category, wherein the plurality of tables includes a first table and a second table, and wherein the first table comprises a first plurality of fields and the second table comprises a second plurality of fields;
    identify relationships between the plurality of tables in the relational data model;
    generate a plurality of forms based on the relationships as identified, each of the plurality of forms corresponding to one of the plurality of tables, the plurality of forms including a first form associated with the first table and a second form associated with the second table, the first form comprising a plurality of first controls, each of the plurality of first controls corresponding to one of the first plurality of fields, the second form comprising a plurality of second controls, each of the plurality of second controls corresponding to one of the second plurality of fields, generating the plurality of forms comprising
        generating a primary record list of the first form, the primary record list comprising the plurality of first controls, the plurality of first controls configured to display and to enable editing of a record, the record comprising related data from the first plurality of fields; and
        generating a tabbed portion of the form based on a relationship between the first table and the second table, the tabbed portion comprising a tab and a pane, the tab being selectable to display the pane, the pane configured to display a plurality of record portions, each of the plurality of record portions comprising related data from the second plurality of fields;
    link the plurality of forms based on the relationships; and
    generate a user interface comprising the plurality of forms as linked.

11. The optical disk, the magnetic storage device, or the solid state storage device of claim 10, wherein to identify the relationships between the plurality of tables in the relational data model, the computer-executable instructions, when executed by the computer, further cause the computer to identify the relationship between the first table and the second table when the second table comprises a reference to the first table.

12. The optical disk, the magnetic storage device, or the solid state storage device of claim 10, wherein the plurality of tables further comprises a third table, the third table comprising a third plurality of fields;
    wherein to identify relationships between the plurality of tables in the relational data model, the computer-executable instructions, when executed by the computer, further cause the computer to identify a second relationship between the first table and the third table when the third table comprises a second reference to the first table; and
    wherein to generate the plurality of forms based on the relationships as identified, the computer-executable instructions, when executed by the computer, further cause the computer to generate a second tabbed portion of the form based on the second relationship between the first table and the third table, the second tabbed portion comprising a second tab and a second pane, the second tab being selectable to display the second pane, the second pane configured to display a second plurality of record portions, each of the second plurality of record portions comprising related data from the third plurality of fields.

13. The optical disk, the magnetic storage device, or the solid state storage device of claim 10, wherein the computer-executable instructions, when executed by the computer, further cause the computer to:
    select a subset of the second plurality of fields by selecting a fixed number of fields from the second plurality of fields according to a priority order defined by metadata associated with the second table, if the metadata is available; and
    select the subset of the second plurality of fields by selecting the fixed number of fields from the second plurality of fields according to a default priority order, if the metadata is unavailable.

14. The optical disk, the magnetic storage device, or the solid state storage device of claim 10, wherein the tabbed portion further comprises an add record control configured to enable a new record to be added.

15. The optical disk, the magnetic storage device, or the solid state storage device of claim 10, wherein the pane comprises a plurality of rows and each of the plurality of record portions is arranged on one of the plurality of rows; and
    wherein to link the plurality of forms based on the relationships, the computer-executable instructions, when executed by the computer, further cause the computer to configure each of the plurality of rows as being selectable to launch the second form based on the relationship between the first table and the second table.

16. The optical disk, the magnetic storage device, or the solid state storage device of claim 10, wherein the computer-executable instructions, when executed by the computer, further cause the computer to:
    receive a user selection of the tab; and
    when the user selection of the tab has been received, filter the plurality of record portions based on the record displayed in the primary record list and display the pane containing the plurality of record portions as filtered.

17. The optical disk, the magnetic storage device, or the solid state storage device of claim 10, wherein to identify the relationships between the plurality of tables in the relational data model, wherein the computer-executable instructions, when executed by the computer, further cause the computer to update a dependency graph of the plurality of tables in accordance with the relationships that are identified.

18. A computer system, comprising:
    a processor;
    a memory communicatively coupled to the processor; and
    a program module which executes in the processor from the memory and which, when executed by the processor, causes the processor to:
        receive a relational data model, the relational data model defining a plurality of tables, wherein each table of the plurality of tables represents a particular category of fields, wherein each field of the particular category of fields represents types of values that are associated with the particular category, wherein the plurality of tables includes a first table and a second table, and wherein the first table comprises a first plurality of fields and the second table comprises a second plurality of fields;
        identify relationships between the plurality of tables in the relational data model, the relationships comprising a relationship between the first table and the second table when the second table comprises a reference to the first table;

generate a plurality of forms based on the relationships as identified, each of the plurality of forms corresponding to one of the plurality of tables, the plurality of forms including a first form associated with the first table and a second form associated with the second table, the first form comprising a plurality of first controls, each of the plurality of first controls corresponding to one of the first plurality of fields, the second form comprising a plurality of second controls, each of the plurality of second controls corresponding to one of the second plurality of fields;

link the plurality of forms based on the relationships; and generate a user interface comprising the plurality of forms as linked;

wherein to generate the plurality of forms based on the relationships as identified, the program module, when executed by the computer, further causes the processor to generate a primary record list of the first form, the primary record list comprising the plurality of first controls, the plurality of first controls configured to display and to enable editing of a record, the record comprising related data from the first plurality of fields, and generate a tabbed portion of the form based on the relationship between the first table and the second table, the tabbed portion comprising a tab and a pane, the tab being selectable to display the pane, the pane configured to display a plurality of record portions, each of the plurality of record portions comprising related data from the second plurality of fields.

* * * * *